US 6,725,324 B2

(12) United States Patent
Collins et al.

(10) Patent No.: US 6,725,324 B2
(45) Date of Patent: Apr. 20, 2004

(54) METHOD AND APPARATUS FOR INCREASING FLASH ROM PROGRAMMING PERFORMANCE IN A MULTIPLE PROCESSOR COMPUTER SYSTEM

(75) Inventors: David L. Collins, Magnolia, TX (US); Steven Ray Dupree, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 196 days.

(21) Appl. No.: 10/127,878

(22) Filed: Apr. 23, 2002

(65) Prior Publication Data

US 2003/0199994 A1 Oct. 23, 2003

(51) Int. Cl.⁷ .............................................. G06F 12/00
(52) U.S. Cl. ........................ 711/103; 365/185.33; 713/2; 700/5
(58) Field of Search ......................... 711/103, 168–169; 365/185.33; 713/2; 700/5; 714/15

(56) References Cited

U.S. PATENT DOCUMENTS

| | | | |
|---|---|---|---|
| 5,694,538 A | * 12/1997 | Okazaki et al. | ................ 714/15 |
| 5,829,013 A | * 10/1998 | Hasbun | ...................... 711/103 |
| 6,081,890 A | * 6/2000 | Datta | ........................... 713/1 |
| 6,594,723 B1 | * 7/2003 | Chapman et al. | ........... 711/103 |

* cited by examiner

Primary Examiner—Nasser Moazzami

(57) ABSTRACT

The disclosed embodiments provide an efficient method and apparatus for reprogramming flash memory in a multiprocessor computer system. A bootstrap processor (BSP) partitions portions of an image to be programmed into the flash memory and may divide those portions amongst itself and one or-more application processors (APs) for reprogramming.

20 Claims, 3 Drawing Sheets

METHOD AND APPARATUS FOR INCREASING FLASH ROM PROGRAMMING PERFORMANCE IN A MULTIPLE PROCESSOR COMPUTER SYSTEM

BACKGROUND OF THE INVENTION

1. Field of the Invention

This invention relates generally to improving operational efficiency in multiprocessor computer systems and, more particularly, to improving the efficiency of programming flash memory associated with the multiprocessor computer system.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

Not surprisingly, the increasing complexity of computers and software applications has presented technologists with some challenging obstacles along the way. One such obstacle is the continual increase in the amount of information that must be stored by a computer system. Larger, more complex applications require computers to have more and more storage capability. A short few years ago, users could scarcely conceive of how they would fill a 500 megabyte hard drive. Today, that same 500 megabyte hard drive would be insufficient for all but the most basic computer system.

A similar phenomenon has occurred with computer memory devices, such as flash memory. Flash memory is memory that is non-volatile, which means it retains the information stored in it even after power is removed. Flash memory may also be reprogrammed electronically. These features make flash memory ideally suited for storing the Basic Input/Output System of modern computer systems.

The Basic Input/Output System (or BIOS) is a low-level program that supports the operation of the most basic functions of a computer system. Amongst these functions, the BIOS controls things like which external storage media is used to boot the computer system's operating system (or OS) as well as the fundamentals of how the computer system's microprocessor interfaces with its supporting integrated circuit chips (sometimes referred to as the north bridge and south bridge, or, collectively, as the chipset) and system memory. The BIOS also controls things like the computer system's power management parameters.

As previously noted, flash memory is non-volatile and can be easily reprogrammed. This functionality means that flash memory that is used to store the BIOS of a computer system or other programming can easily be reprogrammed to accommodate changes or error corrections such as bug fixes. In many cases, flash memory may be reprogrammed without even physically removing the flash chips containing the programming from the computer system.

Like hard drive storage capacity, the amount of non-volatile flash memory contained in typical computer systems has increased dramatically in recent years. This is especially true in modem multiprocessor computer systems such as many of the servers designed manufactured by the assignee of the present invention. These powerful computers may have two, four, eight or even more individual processors. A few years ago, several megabytes of flash memory would have been sufficient to store enough non-volatile programming for computer systems with one or two processors. The addition of more and more processors, however, requires increasing amounts of non-volatile flash memory to contain the associated programming. Modern computer architectures, such as the IA-64 architecture promulgated by Intel Corporation of Santa Clara Calif., have increased available flash memory capacity by 16 times compared to prior architectures.

An undesirable side effect of the dramatic increase in the amount of flash memory required in multiprocessor computer systems is that the time required to program the flash memory is dramatically increased. Thus, the computer system is unusable for an undesirably long time when the flash memory needs to be reprogrammed. Flash memory typically needs to be reprogrammed in the event of a catastrophic system failure or when a program update or error correction revision is made to the code stored in the flash memory.

In a multiprocessor computer system, one of the processors is typically designated to boot the operating system before the other processors are initialized to do useful work. Typically, the processor designated to boot the operating system is referred to as the bootstrap processor or BSP. The other processors in the system are typically designated application processors or APs. In prior computer systems, the BSP has been used to reprograms the entire flash memory of the computer system while the APs remain in a sleeping (or quiescent) state. A more efficient way to reprogram the flash memory in a multiprocessor computer system is desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
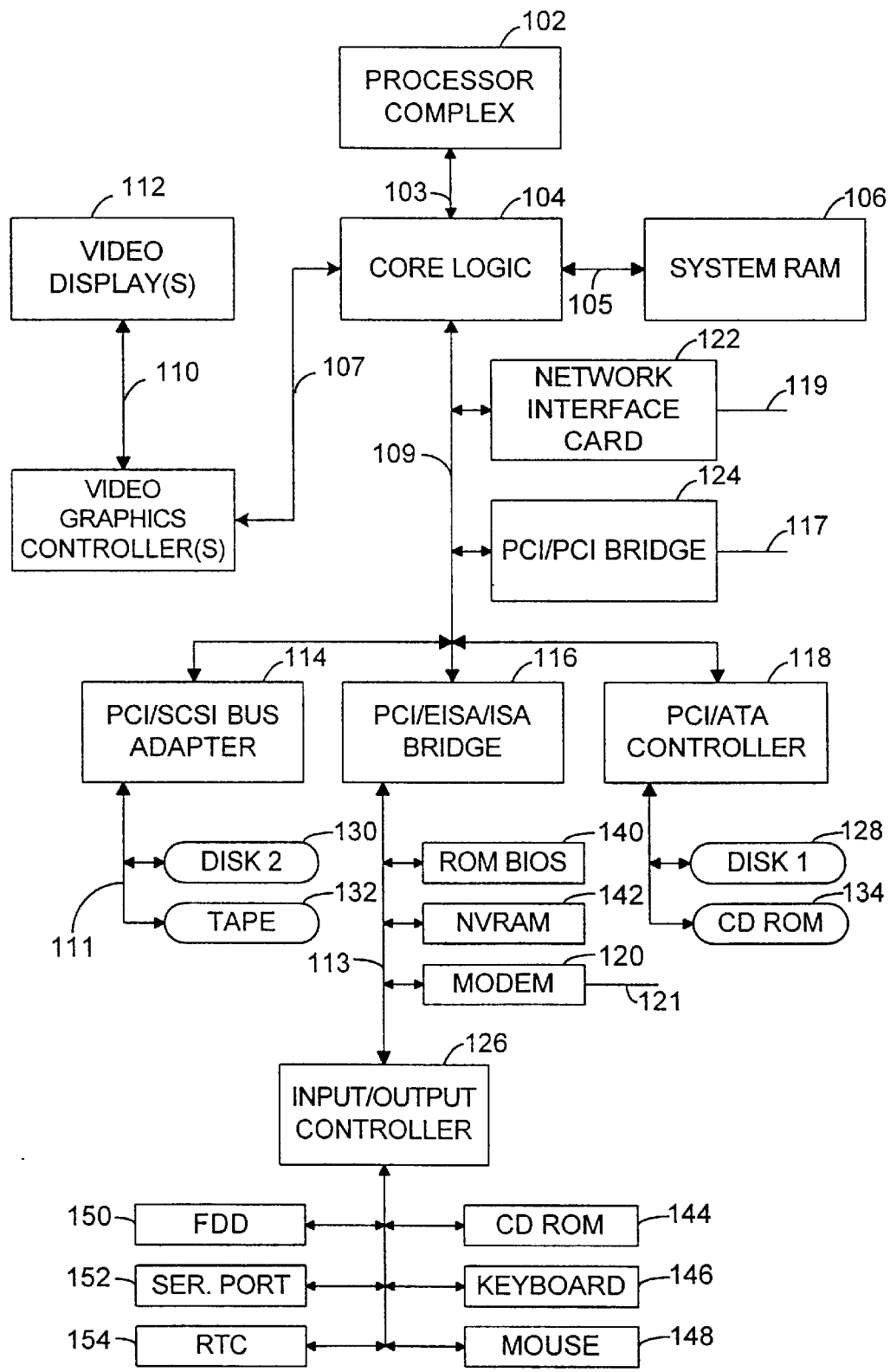
FIG. 1 is a block diagram illustrating a computer system in which the present invention may be practiced.

Referring now to FIG. 1, a schematic block diagram of a computer system utilizing the present invention is illustrated. A computer system is generally indicated by the numeral 100 and comprises a processor complex 102 (which includes a plurality of central processing units ("CPUs")). Also included in the computer system 100 are core logic 104 (or north bridge), system random access memory ("RAM") 106, a video graphics controller(s) 110, a video display(s) 112, a PCI/SCSI bus adapter 114, a PCI/EISA/ISA bridge 116, and a PCI/ATA controller 118. Single or multilevel cache memory (not illustrated) may also be included in the computer system 100 according to the current art of microprocessor computer systems. The processor complex 102 may be arranged in a symmetric or asymmetric multiprocessor configuration.

In the typical operation of a multiprocessor computer system, one of the processors that comprise the processor complex 102 will be designated as the bootstrap processor (BSP) by the system BIOS shortly after the computer system is first powered on. The BSP executes the system power-on self test ("POST") while the other processors (the application processors or APs) remain in a sleeping or quiescent state. After executing the POST, the BSP boots the operating system, which subsequently assigns tasks to the APs.

The processor complex 102 is connected to the core logic 104 through a host bus 103. The system RAM 106 is connected to the core logic 104 through a memory bus 105. The video graphics controller(s) 110 is connected to the core logic 104 through an AGP bus 107 (or other bus for transporting video data). The PCI/SCSI bus adapter 114, PCI/EISA/ISA bridge 116, and PCI/ATA controller 118 are connected to the core logic 104 through a primary PCI bus 109. Those of ordinary skill in the art will appreciate that a PCI-X bus or Infiniband bus may be substituted for the primary PCI bus 109. The specific protocol of the bus 109 is not a crucial aspect of the present invention.

Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated). The PCI/PCI bridge 124 provides an additional PCI bus 117.

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a nonvolatile random access memory (NVRAM) 142, modem 120, and input-output controller 126. The NVRAM 142 may store the system BIOS and/or other programming and may include flash memory, as discussed below with respect to FIG. 2. Additionally, the NVRAM may be contained in a programmable logic array ("PAL") or any other type of programmable non-volatile storage. The modem 120 connects to a telephone line 121. The input-output controller 126 interfaces with a keyboard 146, CD-ROM drive 144, mouse 148, floppy disk drive ("FDD") 150, serial/parallel ports 152 and a real time clock ("RTC") 154. The EISA/ISA bus 113 is a slower information bus than the PCI bus 109, but it costs less to interface with the EISA/ISA bus 113.

Figure 2:
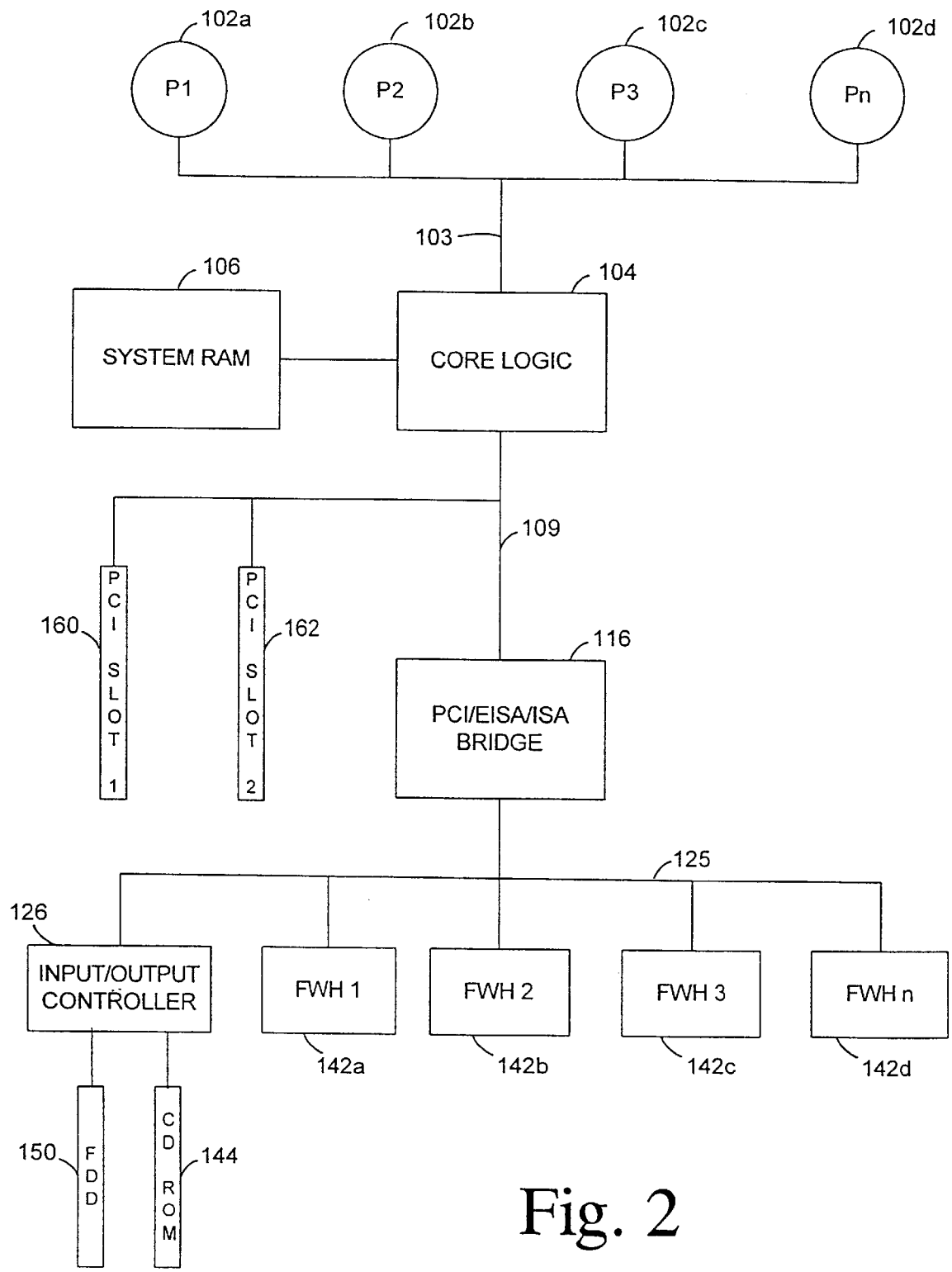
FIG. 2 shows a functional block diagram of one exemplary embodiment of a multiprocessor computer system in which the present invention maybe practiced.

FIG. 2 shows a functional block diagram of one exemplary embodiment of a multiprocessor computer system in which the present invention maybe practiced. The processor complex 102 (FIG. 1) is illustrated as a plurality of processors 102a–102d in FIG. 2. Those of ordinary skill in the art will appreciate that any number of processors may be used in the present invention. The number of processors employed is not a crucial aspect of the invention. As shown in FIG. 2, the PCI bus 109 is connected to PCI slots 160, 162, which may contain PCI devices such as the PCI/SCSI bus adapter 114 or the PCI/ATA controller 118. In addition, the PCI bus 109 is connected to the PCI/EISA/ISA bridge 116.

The PCI/EISA/ISA bridge 116 is connected to the I/O controller 126 and NVRAM 142 by a Low Pin Count ("LPC") bus 125. The LPC bus 125 operates according to the industry standard LPC bus protocol, which is well known to those of ordinary skill in the art. In the illustrated embodiment, the LPC bus 125 operates at a speed of 33 MHz.

In FIG. 2, the NVRAM 142 is shown as a plurality of firmware hubs 142a–142d. For purposes of illustration, four firmware hubs are shown. Those of ordinary skill in the art will appreciate that the invention maybe practiced with any number of firmware hubs. The exact number of firmware hubs used is not a crucial aspect of the present invention.

Each of the firmware hubs 142a–142d may contain one or more flash memory devices, which may store the BIOS for the computer system 100 or other programming to be utilized by the system. As set forth below, the disclosed embodiments provide an efficient manner for reprogramming the flash memory in the firmware hubs 142a–142d. In addition to firmware hubs containing flash memory, the NVRAM 142 may include other types of non-volatile storage such as Programmable Array Logic devices ("PALs").

Many modern computer systems employ a messaging protocol known as the Advanced Programmable Interrupt Controller protocol, which is sometimes referred to by the acronym APIC. Computer systems based on IA-32 processors manufactured by Intel Corporation of Santa Clara, Calif. are examples of computer systems that may employ the APIC protocol. Intel also produces IA-64 processors that employ a similar protocol known as System Advanced Programmable Interrupt Controller protocol or SAPIC.

The purpose of the APIC and SAPIC protocols is to provide a structure that allows software interrupts to the processor complex 102. The software interrupt ability provided by APIC and SAPIC are in addition to hardware interrupt functionality provided as part of the architecture of a typical computer system. APIC and SAPIC are and message-based protocols that provide messages in a format compatible with the Peripheral Component Interconnect ("PCI") protocol. Thus, APIC or SAPIC interrupt messages may be passed from the various system devices such a as PCI devices in the PCI slots 160, 162. The messages are sent to the core logic 104 via the PCI bus 109 and are in turn forwarded to one of the processors 12a–102d via the host bus 103.

Software interrupt messages may also be sent from system devices connected to the I/O controller 126, such as the floppy disk drive 150 or the CD ROM 144. These messages are transferred to the PCI/EISA/ISA bridge 116 across the LPC bus 125. The PCI/EISA/ISA bridge 116 converts the interrupt requests received from the devices attached to the I/O controller 126 into PCI-based APIC or SAPIC messages, which are in turn passed on to the core logic 104 for further processing and forwarding to the processor complex 102.

In addition to supporting iInterrupts from system devices as described above, the APIC and SAPIC protocols also facilitate the interrupt messages between the processors of a multiprocessor system. These interrupt messages are known as intra-processor interrupts or IPIs.

In the disclosed embodiments, the system BIOS is programmed to recognize when an update to the flash memory contained in the firmware hubs 142a–142d needs to be performed. This recognition occurs on system power up. If the BIOS detects that the non-volatile memory 142 is to be reprogrammed, the system BIOS issues an intra-processor interrupt (IPI) to rendezvous the processors 102a–102d at a common memory location in the system memory 106. Next, one of the processors 102a–102d is designated as the bootstrap processor or BSP.

The BSP obtains the new image that is to be programmed into the flash memory from a predetermined source. The predetermined source may be the system CD ROM 144 or the system floppy disk drive 150. Alternatively, the source of the image with which to reprogram the flash memory may be obtained from any source accessible to the BSP. The location of the image with which to program the flash memory is not a crucial aspect of the present invention. When the BSP obtains the image, the image may be stored in system RAM 106 for later access.

After storing the image with which to program the flash memory contained in the firmware hubs 142a–142d, the BSP allocates a portion of the stored image to one or more of the application processors. In addition, the BSP may allocate a portion of the image to itself. Those of ordinary skill in the art will appreciate that the BSP may allocate any subset of processors 102a–102d to reprogram the flash memory contained in the firmware hubs 142a–142d. The number and identity of the processors chosen to reprogram the flash memory is not a crucial aspect of the present invention. When commanded by BSP, the processors that have been allocated a portion of the image will each program the appropriate portions of the flash memory contained in the firmware hubs 142a–142d. By utilizing multiple processors to reprogram the flash memory contained in the firmware hubs 142a–142d, the time required to reprogram the flash memory is dramatically reduced.

After the BSP has allocated the image among the processors 102a–102d, the APs obtain their assigned portion of the image from the appropriate memory location in the system memory 106. In this manner, each processor may obtain the portion of the image that it will reprogram into the flash memory contained in the firmware hubs 142a–142d. Each processor that has been allocated a portion to reprogram them independently obtains its portion of the image from the system RAM 106 and proceeds to reprogram the appropriate portion of flash memory contained in the firmware hubs 142a–142d.

The BSP, which may participate in reprogramming a portion of the flash memory, monitors the progress of the reprogramming. Each of the APs may be programmed to report when it has completed reprogramming its portion of the flash memory. This reporting may be done using a memory semaphore or any other method. If a memory semaphore is used, the BSP may check the semaphore periodically to determine if each of the designated processors has completed its portion of the reprogramming task. When all processors have completed their portion of reprogramming the flash memory, the BSP reboots the computer system.

In an alternative embodiment of the invention, the BSP may designate itself (or a single one of the APs) to perform the reprogramming operation. The BSP may then allocate the image to be reprogrammed into a number of different segments, each segment corresponding to a portion of the flash memory contained in the firmware hubs 142a–142d. The individual processor that is assigned the task of reprogramming the flash memory may then cycle through the different segments by starting the reprogramming of one segment and moving on to another segment. Time efficiencies are obtained in this embodiment because the flash memory from one segment can continue the reprogramming process (for example, completing an authentication or erase process) while the processor continues on to begin the reprogramming of subsequent segments.

Figure 3:
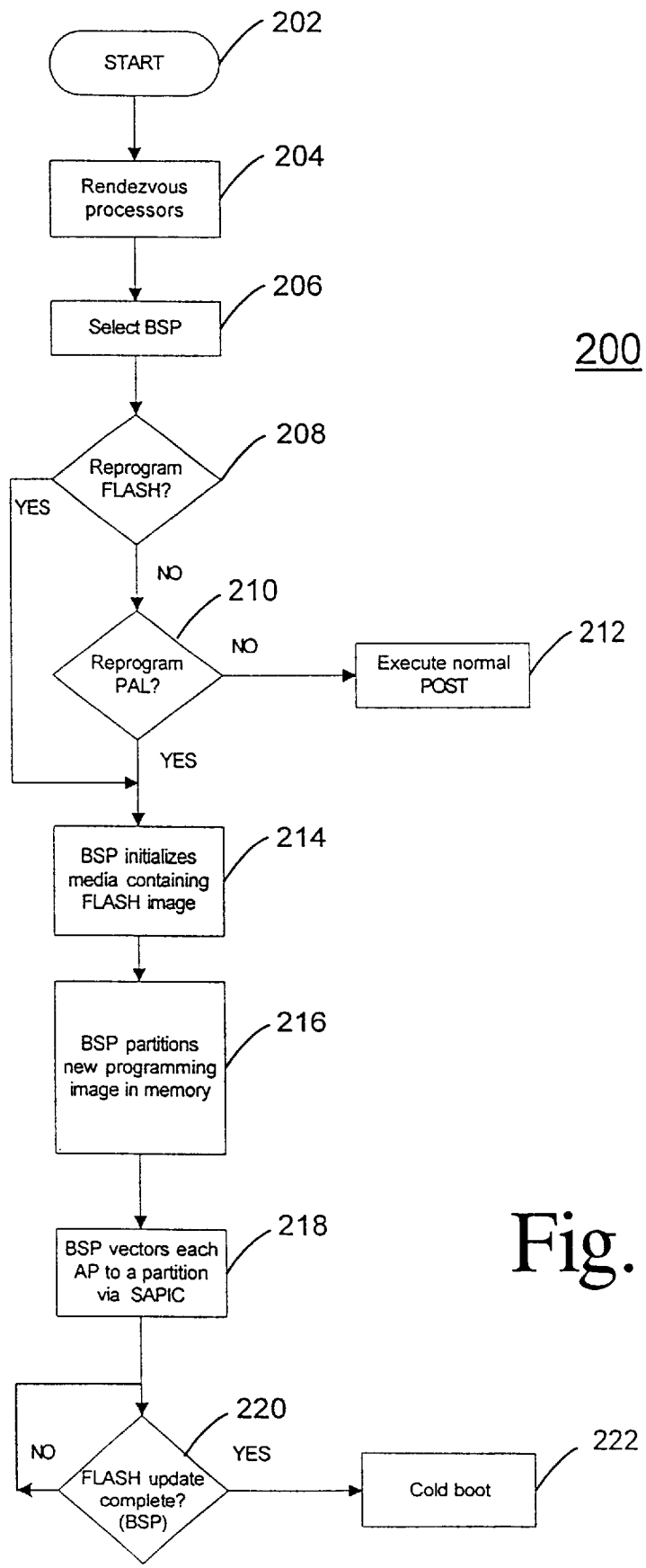
FIG. 3 is a process flow diagram illustrating the operation of an embodiment of the present invention.

FIG. 3 is a process flow diagram illustrating the operation of an embodiment of the present invention. The process is generally referred to by the reference numeral 200. At 202, the process is initiated by the powering on of the computer system 100 (FIG. 1). At 204, all system processors 102a–102d are caused to rendezvous at a common memory location in the system memory 106. A bootstrap processor (BSP) is identified at 206.

Next, at 208, the system BIOS determines whether the flash memory contained in the firmware hubs 142a–142d is to be reprogrammed. Reprogramming may be indicated if the system BIOS or other programming contained in the firmware hubs needs to be updated, revised or corrected. Reprogramming may also be performed if the programming in the firmware hubs 142a–142d has become corrupted or otherwise caused a system failure. The system BIOS may also determine if another form of of NVRAM, such as a PAL, is to be reprogrammed as shown at 210. If no NVRAM is to be reprogrammed, system power up continues normally with the execution of the power on self test ("POST") at 212.

If NVRAM, such as the flash memory contained in the firmware hubs 142a–142d is to be reprogrammed, the BSP initializes the media containing the image with which to reprogram memory at 214. At 216, the BSP partitions the code stored system memory and splits up the reprogramming task amongst itself and/or one or more of the system APs. At 218, the BSP initiates the actual reprogramming operation with an intra-processor interrupt. The intra-processor interrupt may be performed using the APIC or SAPIC protocol.

As shown at 220, the BSP monitors the progress of the reprogramming operation. When the reprogramming operation is completed, the computer system 100 (FIG. 1) is subjected to a cold boot.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system, comprising:
   a processor complex having a plurality of processors;
   a system memory accessible by at least one of the plurality of processors;

a system BIOS adapted to rendezvous the plurality of processors to a common memory location in the system memory and designate one of the processors as a bootstrap processor;

a non-volatile memory device adapted to be accessible to the plurality of processors;

wherein the bootstrap processor is adapted to:
  program the non-volatile memory device by partitioning an image to be programmed into the non-volatile memory device into segments;
  divide the segments amongst one or more of the plurality of processors, each of the one or more of the plurality of processors being assigned to program a portion of the non-volatile memory device corresponding to its respective segment; and
  monitor the progress of the one or more of the plurality of processors to determine when the programming of the non-volatile memory device is completed.

2. The computer system of claim 1 wherein the bootstrap processor is adapted to reboot the computer system when the programming of the memory device is completed.

3. The computer system of claim 1 wherein the non-volatile memory device is a flash memory.

4. The computer system of claim 3 wherein the flash memory is disposed in a firmware hub.

5. The computer system of claim 1 wherein the non-volatile memory device is a programmable array logic device.

6. The computer system of claim 1 wherein the plurality of processors is adapted to communicate using the Advanced Programmable Interrupt Controller messaging protocol.

7. The computer system of claim 1 wherein the plurality of processors is adapted to communicate using the System Advanced Programmable Interrupt Controller messaging protocol.

8. A method of programming a non-volatile memory device associated with a multiprocessor computer system, the method comprising the acts of:
  determining whether the non-volatile memory device is to be reprogrammed;
  responsive to the act of determining, partitioning an image to be programmed into the non-volatile memory device into segments;
  dividing the segments amongst one or more of the plurality of processors;
  assigning at least one of the one or more of the plurality of processors to program a portion of the non-volatile memory device corresponding to its respective segment; and
  monitoring the progress of the one or more of the plurality of processors to determine when the programming of the non-volatile memory device is completed.

9. The method of claim 8, further comprising the act of rebooting the computer system when the programming of the non-volatile memory device is completed.

10. The method of claim 8, further comprising the act of rendezvousing the plurality of processors to a common memory location in a system memory device associated with the multiprocessor computer system.

11. The method of claim 10, wherein the act of rendezvousing the plurality of processors further comprises the act of sending an intra-processor interrupt.

12. The method of claim 11, wherein the intra-processor interrupt is an Advanced Programmable Interrupt Controller message.

13. The method of claim 11, wherein the intra-processor interrupt is a System Advanced Programmable Interrupt Controller message.

14. The method of claim 8 wherein the non-volatile memory device is a flash memory.

15. The method of claim 14 wherein the flash memory is located in a firmware hub.

16. The method of claim 8 wherein the non-volatile memory device is a programmable array logic device.

17. The method of claim 8 wherein the act of monitoring the progress comprises the act of periodically checking a memory semaphore to determine if all processors have completed there portion of the reprogramming operation.

18. The method of claim 8 wherein the recited acts are performed in the recited order.

19. A system BIOS for a multiprocessor computer system having a plurality of processors, a system memory that is accessible by at least one of the plurality of processors and a non-volatile memory device adapted to be accessible to the plurality of processors, the system BIOS being adapted to:
  rendezvous the plurality of processors to a common memory location in the system memory;
  designate one of the processors as a bootstrap processor;
  control the bootstrap processor to program the non-volatile memory device by partitioning an image to be programmed into the non-volatile memory device into segments;
  control the bootstrap processor to divide the segments amongst one or more of the plurality of processors;
  control the bootstrap processor to assign at least one of the one or more of the plurality of processors to program a portion of the non-volatile memory device corresponding to its respective segment; and
  control the bootstrap processor to monitor the progress of the one or more of the plurality of processors to determine when the programming of the non-volatile memory device is completed.

20. The system BIOS of claim 19, the system BIOS being adapted to control the bootstrap processor to reboot the computer system when the programming of the memory device is completed.

* * * * *